United States Patent
Harding, Jr.

[11] Patent Number: 5,167,215
[45] Date of Patent: Dec. 1, 1992

[54] DUST REMOVAL APPARATUS FOR A CONCRETE SAW

[75] Inventor: Edward M. Harding, Jr., Middletown, Md.

[73] Assignee: Equipment Development Co., Inc., Frederick, Md.

[21] Appl. No.: 774,808

[22] Filed: Oct. 11, 1991

[51] Int. Cl.$^5$ .......................... B28D 7/02; B28D 1/04
[52] U.S. Cl. .................... 125/13.01; 125/14; 51/273; 83/100; 83/168; 30/124
[58] Field of Search ............ 125/12, 13.01, 13.02, 125/13.03, 14, 15; 51/268, 270, 272, 273, 174, 176, 177; 83/100, 168; 144/252 R, 252 A; 30/124, 391

[56] References Cited

U.S. PATENT DOCUMENTS

| | | | |
|---|---|---|---|
| 1,560,658 | 11/1925 | Bull | 51/273 |
| 2,179,995 | 11/1939 | Emmons | 51/176 |
| 4,253,362 | 3/1981 | Olson | 144/252 R X |
| 4,255,995 | 3/1981 | Connor | 83/100 |
| 4,462,381 | 7/1984 | Fushiya et al. | 51/273 X |
| 4,953,523 | 9/1990 | Swan . | |
| 5,074,044 | 12/1991 | Duncan et al. | 125/13.01 X |
| 5,084,972 | 2/1992 | Waugh | 83/168 X |

FOREIGN PATENT DOCUMENTS

| | | | |
|---|---|---|---|
| 453953 | 1/1949 | Canada | 125/14 |
| 840422 | 7/1960 | United Kingdom | 51/273 |
| 2131861 | 6/1984 | United Kingdom | 51/273 |

Primary Examiner—Bruce M. Kisliuk
Assistant Examiner—John A. Marlott

[57] ABSTRACT

A concrete saw mounted on a wheeled housing for making a substantially linear cut in the surface of a masonry slab is provided with a dust removal apparatus. The dust removal apparatus includes a blade guard partially surrounding the circular blade mounted for rotation on the side of the wheeled housing and a pivotally mounted funnel mounted on the blade guard. The funnel is telescopically mounted on a portion of the blade guard and extends between the blade guard and the slab being cut. A bottom edge of the funnel is provided with a rounded bearing surface so that it rides on the surface of the slab. A vacuum machine is connected to an exhaust duct of the funnel so that concrete dust generated during the making of a cut is continuously exhausted through the funnel and a flexible hose to the vacuum machine as a cut is being made.

8 Claims, 3 Drawing Sheets

FULL UP POSITION

STARTING CUT

FULL DOWN POSITION

DUST REMOVAL APPARATUS FOR A CONCRETE SAW

BACKGROUND OF THE INVENTION

The present invention relates to a dust removal apparatus for a saw for cutting concrete or asphalt slabs or the like. More specifically, the present invention relates to a dust removal apparatus for a saw mounted on a wheeled housing, the saw making a substantially linear cut in the surface of a workpiece such as a concrete or asphalt floor or slab.

Saws for making linear cuts in concrete or asphalt slabs are generally known. Such a saw is disclosed in Applicant's prior U.S. Pat. No. 4,953,523 issued Sep. 4, 1990. Saws of this type make linear cuts in the slabs as the wheeled housing of the saw traverses the slab. During this process an extraordinary amount of concrete dust or the like is generated which is normally flung into the environment surrounding the saw with potential contamination to the entire area.

Concrete dust may also be hazardous to the health of the saw operator or other persons in the immediate vicinity of the saw. Depending on the nature of the dust various forms of illness or physical impairments may develop. Recently there has been great concern by environmentalists and regulatory agencies with respect to hazards presented by this concrete dust. This has caused an increased awareness in the industry that a suitable apparatus must be developed for effective and efficient removing this concrete dust from the work area during the operation of the saws to preclude contamination of the environment and injury to the operators.

SUMMARY OF THE INVENTION

Accordingly, it is a primary object of the present invention to provide a dust removal apparatus for a wheeled concrete saw which efficiently and effectively removes concrete dust as it is generated during the operation of the saw.

It is another object of the present invention to provide a dust removal apparatus for a concrete saw which can be easily retrofit to existing concrete saws in order to economically achieve the function of dust removal.

The objects of the present invention are fulfilled by providing a dust removal apparatus for a concrete saw, said concrete saw including a wheeled housing for rolling on the surface of a workpiece to be cut, and a circular blade rotatably mounted on a sidewall of the housing for making a linear cut in the workpiece as the wheeled housing traverses a linear path, comprising:

a blade guard having a top wall covering an upper edge of the blade and a pair of parallel sidewalls straddling sidewalls of the circular blade, said blade guard being rigidly secured to said side of said wheeled housing; and funnel means pivotally mounted about an axis on said blade guard and extending from said blade guard to the surface of said workpiece, said funnel means being telescopically disposed with respect to a portion of the blade guard and having a bottom edge which rests on and follows the contour of the surface of the workpiece to thereby pivot the funnel means about said axis and telescope the funnel means with respect to the blade guard, said funnel means including an exhaust duct through a wall thereof, said funnel means collecting concrete dust or the like from said workpiece generated by the circular blade as the linear cut is made and directing the dust toward a vacuum source through said exhaust duct.

When the direction of blade rotation is arranged to make an up-cut in a slab, a front portion of the top wall of the blade guard has a circular curvature which is substantially concentric with the edge of the circular blade and the funnel means includes an end wall having the same circular curvature as the top wall portion of the blade guard which lies over the top wall portion and moves parallel thereto as the funnel means pivots about the axis on the blade guard. The funnel means also is provided with sector-shaped sidewalls extending between the axis about which the funnel means pivots in the endwall thereof. The sector-shaped sidewalls are disposed substantially parallel to the sidewalls of the blade guard and surround the same so that as the funnel means pivots about the axis on the blade guard the funnel telescopes with respect to the blade guard and follows the contour of the surface of the workpiece.

The exhaust duct in the funnel means extends through the curved endwall of the funnel and is preferably oriented in a substantially tangential direction to the edge of the circular blade in order to efficiently capture the concrete dust as it is thrown off the blade edge while the linear cut is being made.

The bottom edge of the funnel which rides on the surface of the workpiece being cut is preferably rounded in the provision of a bearing surface which engages and slides across the surface.

When the saw is arranged for a down-cut the funnel has a different shape than for an up-cut, and is located to the rear of the blade guard rather than the front. In this embodiment the funnel is pivotally mounted on the inside of the blade guard. An input end of the funnel straddles the circular blade.

A vacuum source such as a wheeled vacuum machine is coupled to the exhaust duct of the funnel through a flexible hose of a substantial length. The vacuum machine would generally be disposed on the same slab or workpiece which is being cut but at a distance spaced from the concrete saw.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF PREFERRED EMBODIMENTS

Figure 1:
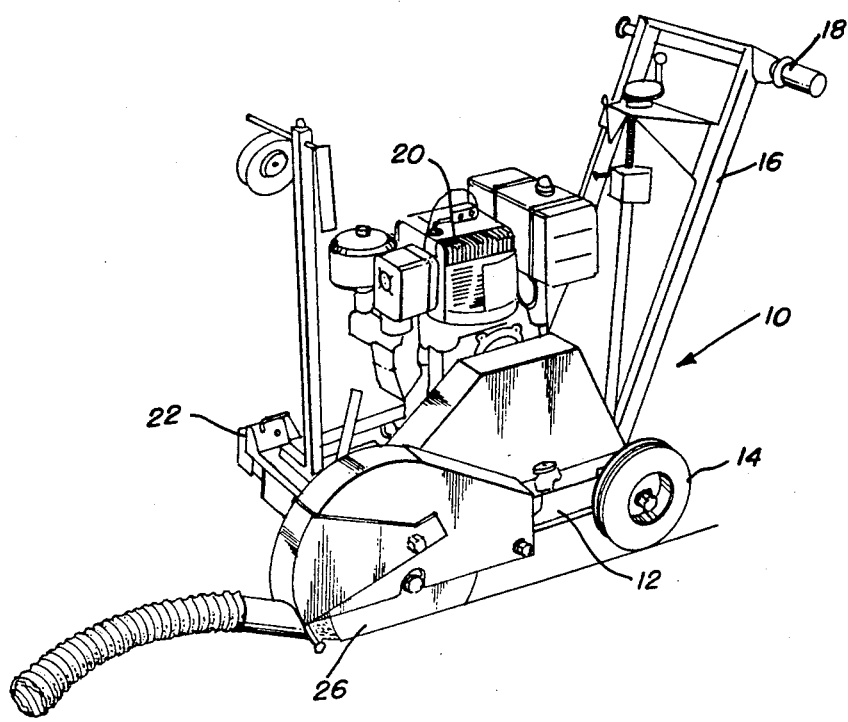
FIG. 1 is a perspective view illustrating a concrete saw with an up-cut dust removal apparatus of the present invention disposed thereon.

Referring in detail to FIG. 1 there is illustrated a wheeled concrete saw on which the dust removal apparatus of the present invention is mounted. The concrete saw is generally indicated 10 and includes a wheeled housing 12 having wheels 14 thereon to facilitate movement of the saw along the surface of a workpiece such as a concrete or asphalt slab 15. The saw also includes a handle frame 16 with handles 18 thereon, a gasoline powered engine 20 and a mounting bracket 22 provided on both sidewalls of the housing 12. A concrete saw of this general type exclusive of the dust removal apparatus of the present invention is disclosed in Applicant's prior U.S. Pat. No. 4,953,523 issued Sep. 4, 1990 the details of which are incorporated herein by reference.

Figure 2:
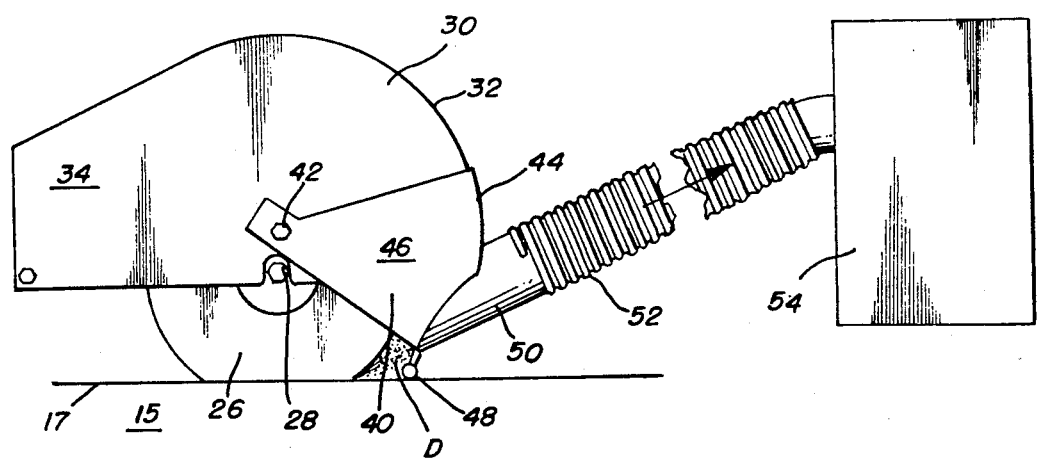
FIG. 2 is an enlarged side elevational view of the dust removal apparatus of FIG. 1 as it would be mounted on a right side of the masonry saw of FIG. 1, and connected to a suitable vacuum source through a flexible hose.

A circular cutting blade 26 may be mounted on either the left or the right sidewall of housing 12 on a mounting bracket 22. The blade may be rotated in either direction to make either an up-cut or a down-cut in the slab. In FIG. 1 the blade 26 and associated dust removal apparatus of the present invention are mounted on the left sidewall of housing 12 but the dust removal apparatus of the present invention and blade 26 in FIG. 2 are mounted on the right side of the saw housing. In both figures the blade is rotated to make an up-cut in the slab.

A blade guard 30 is providing for covering the top portion of the circular cutting blade 26. Blade guard 30 is suitably bolted to the sidewall of housing 12 and includes a top wall and a pair of sidewalls 34. The top wall in the FIG. 1 embodiment has a substantially circular surface portion 32 which is concentric to the circular edge of blade 26.

Blade 26 may be rotated in either direction by the drive train associated with motor 20 to provide either an up cut or a down-cut. For the purposes of illustration of the operation of the dust removal apparatus of the present invention FIGS. 2 and 3 illustrate an up cut configuration wherein the blade 26 is rotated in a counter-clockwise direction and the wheeled housing 12 is moved from left to right and makes a linear cut 17 in the slab 15.

The dust removal apparatus of the present invention includes a funnel means 40 pivotally mounted on bolts or pins 42 in both sidewalls 34 of the blade guard 30. The funnel means includes an endwall 44 having a circular curvature which is substantially the same as the circular curvature of portion 32 of blade guard 30. The funnel means 40 also has a pair of parallel, spaced sidewalls 46 which are sector-shaped and are disposed substantially parallel, and in surrounding relationship, to the sidewalls 34 of the blade guard 30. A duct 50 extends through the curved endwall 44 of the funnel and is coupled to a flexible hose 52 which extends to a remotely disposed vacuum source 54.

A bottom edge 48 of the funnel 40 is rounded in the provision of a bearing surface which rides along the surface of the slab being cut. The exhaust duct 50 is disposed substantially tangential to the edge of the rotating circular blade 26 so that it is in alignment with the direction of the masonry dust being flung by the circular blade as the linear cut is being made.

Figure 3A:
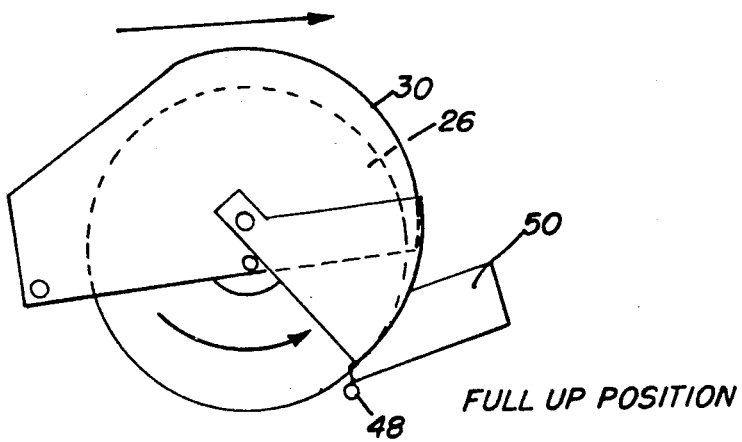
FIGS. 3A to 3C illustrate the operation of the up-cut dust removal apparatus of FIGS. 1 and 2.
Figure 3B:
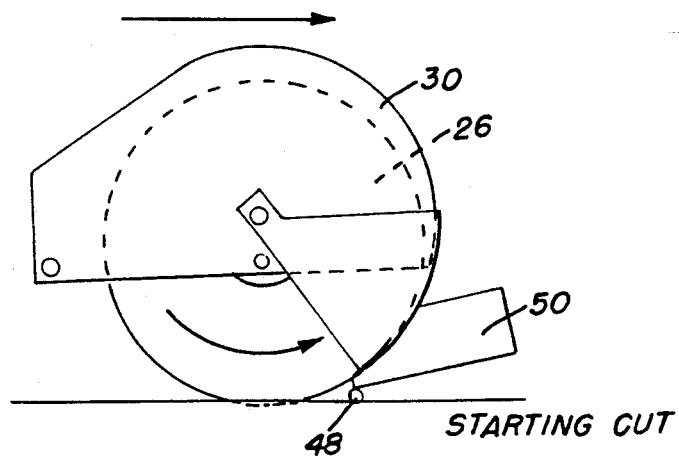
Figure 3C:
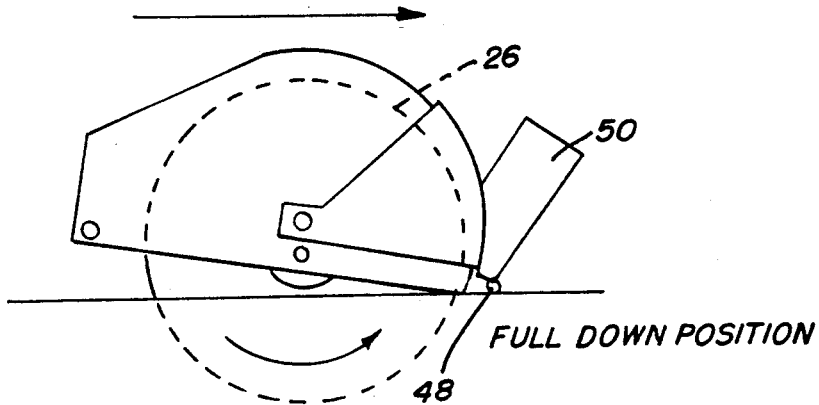
Figure 4A:
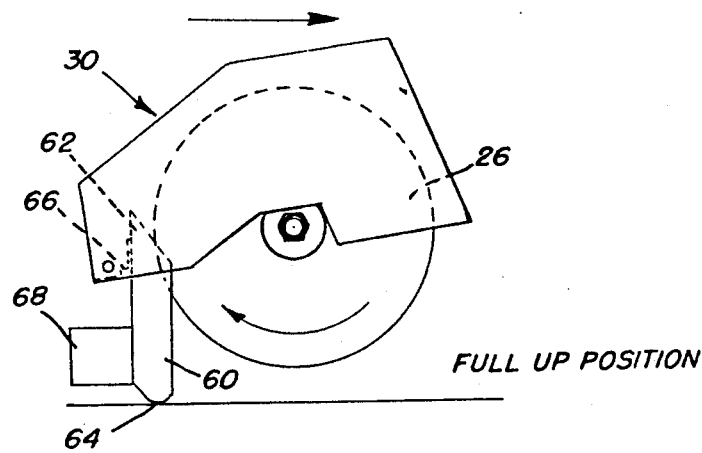
FIGS. 4A to 4C illustrate a down-cut dust removal apparatus mounted on the trailing end of the blade guard, and the operation thereof.
Figure 4B:
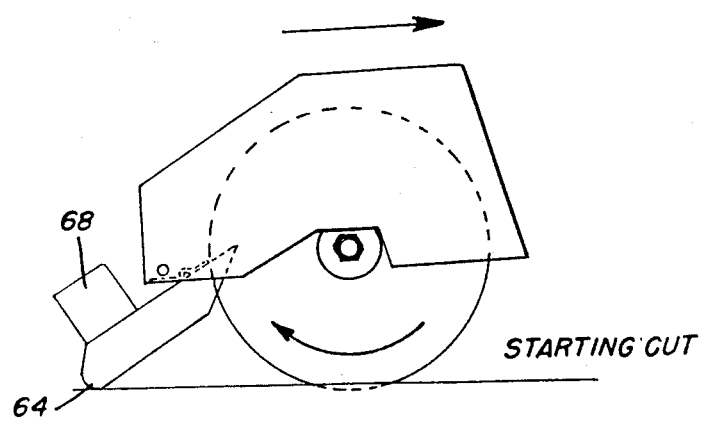
Figure 4C:
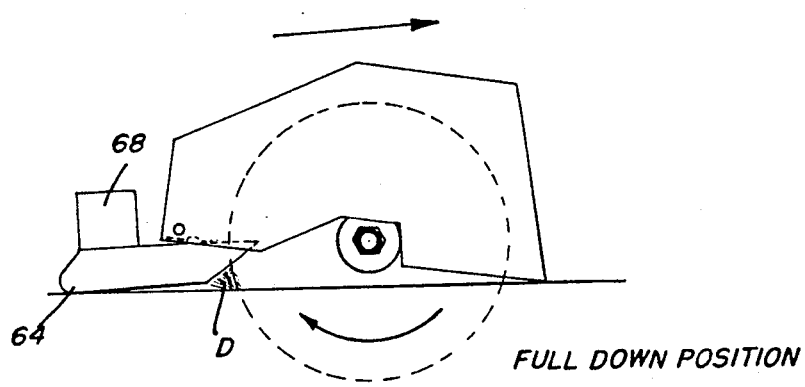
Figure 5:
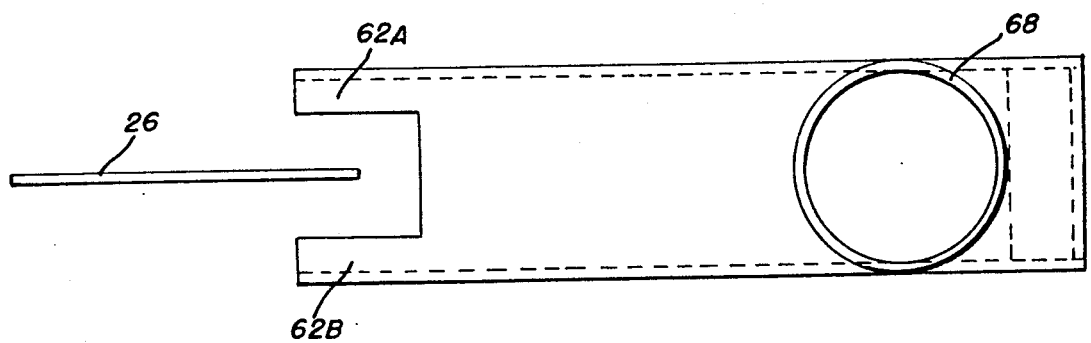
FIG. 5 is a top plan view of the down-cut dust removal apparatus of FIGS. 14 illustrating a bifurcated input end which straddles the saw blade.

As illustrated in FIGS. 3A to 3B the saw blade and guard assembly are vertically movable from a "full up" position, to a "starting" position, to a "full down" position.

In operation in the "full down" position, as the wheeled cart 12 is propelled along the surface of the slab by the operator and the cart is moving from left to right as illustrated in FIGS. 2 and 3, concrete dust D is being flung up from the slab surface into the funnel 40 and is focused along the exhaust duct 50 which is connected to the vacuum source 54 through flexible hose 52. At the same time the funnel means rests on bearing edge 48 and follows the contour of the slab. As it follows the contour of the slab it pivots about the axis defined by bolt 42 and curve surface 44 telescopes and rides up and down over the curved surface 32 of the blade guard. Accordingly, as the cut is being made the funnel of the present invention collects and directs substantially all of the concrete dust being generated through the exhaust duct 50 to the vacuum source 54.

Referring to FIGS. 4A to 4C and 5 there is illustrated a funnel 60 for use with a saw blade arranged to rotate in a down-cut direction. The direction of movement of the saw is indicated by the arrows in FIG. 4, and the blade rotates in a clockwise direction as shown.

Funnel 60 has a bifurcated input end 62 with legs 62A, 62B that straddle blade 26. End 62 is opened to receive dust D (see FIG. 4C) as the slab is being cut. Funnel 60 is hinged at 66 to the inside of blade guard housing 30 to telescope therein as the saw is moved between the "full up", "starting" and "full down" positions of FIGS. 4A, 4B and 4C, respectively. Funnel 60 is provided with a duct 68 connectable to a vacuum source such as 54 of FIG. 2.

In operation funnel 60 follows the surface of a slab as a cut is made, rounded end 64 sliding along the surface of the slab.

The dust removal apparatus of the present invention including the blade guard bolted to the sidewall of the wheel housing of the masonry saw, and the pivotable funnel, can be easily retrofit to existing masonry saws which already include a blade guard of a different shape and configuration. Therefore, the retrofitting is achieved by substituting the combination of the blade guard of the present invention and associated funnel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Dust removal apparatus for a concrete saw, said concentrate saw including a wheeled housing for rolling on the surface of a workpiece to be cut, and a circular blade rotatably mounted on a sidewall of the housing for making a substantially linear cut in the workpiece as the wheeled housing traverses a linear path, comprising:

a blade guard having a top wall covering an upper edge of the blade and parallel sidewalls straddling the sidewalls of the circular blade, said blade guard being rigidly secured to said side of said wheeled housing; and funnel means pivotably mounted about an axis on said blade guard and extending from said blade guard to the surface of said workpiece, said funnel means being telescopically disposed in a portion of the blade guard and having a bottom edge which rests on and follows the contour of the surface of the workpiece to thereby pivot the funnel means about said axis and telescope the funnel means with respect to the blade guard, said funnel means including an exhaust duct through a wall thereof, wherein a portion of the top wall of the blade guard has a circular curvature which is substantially concentric with the edge of the circular blade, and said funnel means further comprises, an end wall having the same circular curvature as the top wall portion of the blade guard which lies over the top wall portion and moves parallel thereto as the funnel means pivots about said axis, and sector-shaped sidewalls extending between said axis and said end wall, said sector-shaped sidewalls being substantially parallel to the sidewalls of the blade guard and surrounding portions thereof, said funnel means collecting masonry dust from said workpiece generated by the circular blade as the linear cut is made and directing the masonry dust toward a vacuum source through said exhaust duct.

2. The dust removal apparatus of claim 1 wherein said exhaust duct extends through said end wall.

3. The dust removal apparatus of claim 2 wherein a longitudinal axis of the exhaust duct is disposed substantially tangentially to the edge of the circular blade.

4. The dust removal apparatus of claim 3 wherein the bottom edge of the funnel means has a rounded bearing surface for engaging the surface of the workpiece.

5. The dust removal apparatus of claim 4 further including a vacuum source connected to said exhaust duct.

6. Dust removal apparatus for a concrete saw, said concrete saw including a wheeled housing for rolling on the surface of a workpiece to be cut, and a circular blade rotatably mounted on a sidewall of the housing for making a substantially linear cut in the workpiece as the wheeled housing transverse a linear path, comprising:

a blade guard having a top wall covering an upper edge of the blade and parallel sidewalls straddling the sidewalls of the circular blade, said blade guard being rigidly secured to said side of said wheeled housing; and funnel means pivotably mounted inside of said blade guard about an axis thereon a predetermined distance away from a rotational axis of said circular blade and extending from said blade guard to the surface of said workpiece, said funnel means having a rounded bottom edge which rests on and follows the contour of the surface of the workpiece to thereby pivot the funnel means about said axis, said funnel means further having bifurcated input end which straddles the circular blade and further including an exhaust duct through a wall thereof, said funnel means collecting masonry dust from said workpiece generated by the circular blade as the linear cut is made and directing the masonry dust toward a vacuum source through said exhaust duct.

7. The dust removal apparatus of claim 6 wherein said rounded bottom edge is located at a rear end of said funnel means.

8. The dust removal apparatus of claim 6 wherein said rounded bottom edge is located to the rear of said bifurcated input end of said funnel means.

* * * * *